Figure 1A:
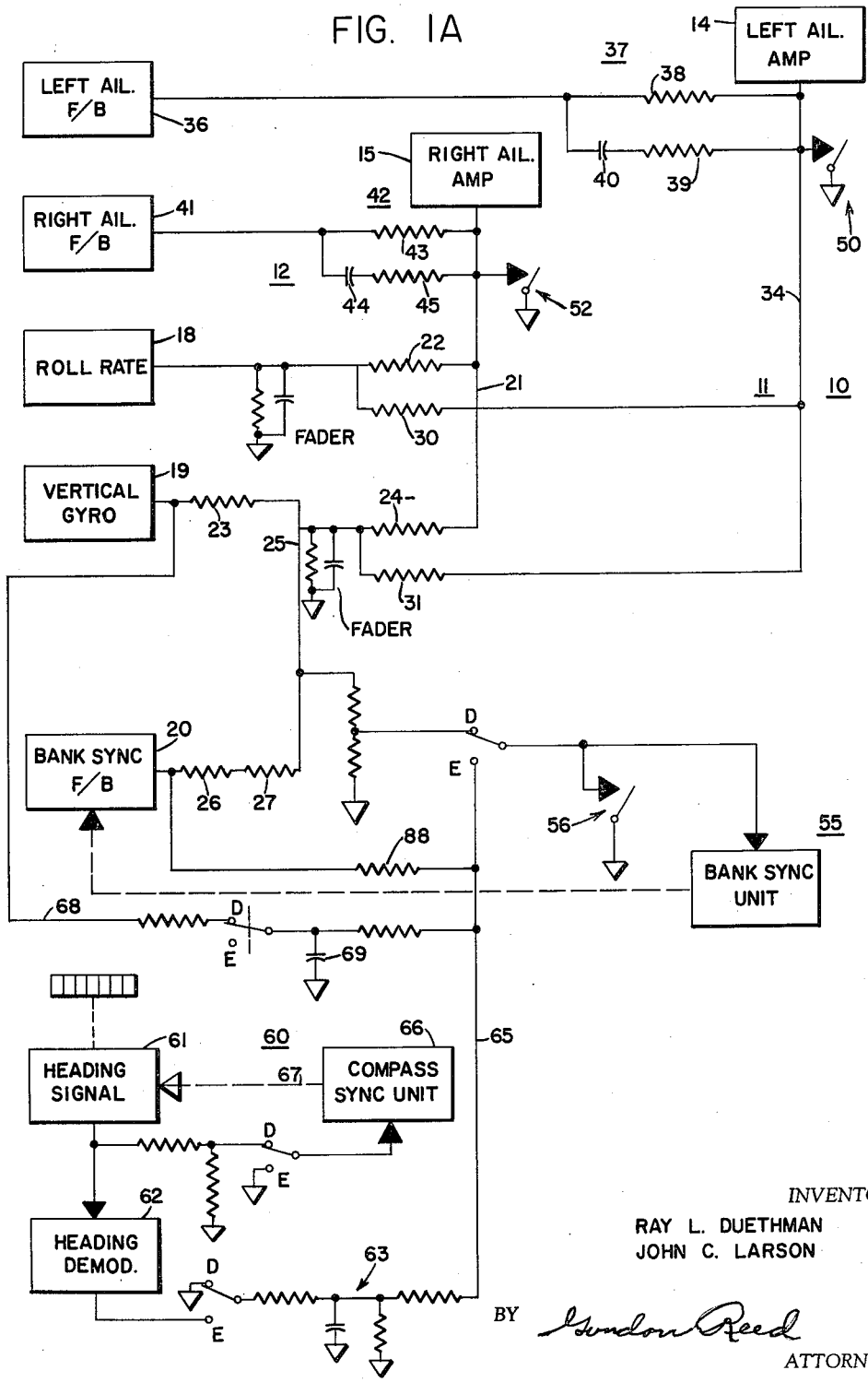

June 5, 1962 R. L. DUETHMAN ETAL 3,037,724
CONTROL APPARATUS
Filed Dec. 1, 1959 2 Sheets-Sheet 1

INVENTORS
RAY L. DUETHMAN
JOHN C. LARSON
BY Gordon Reed
ATTORNEY

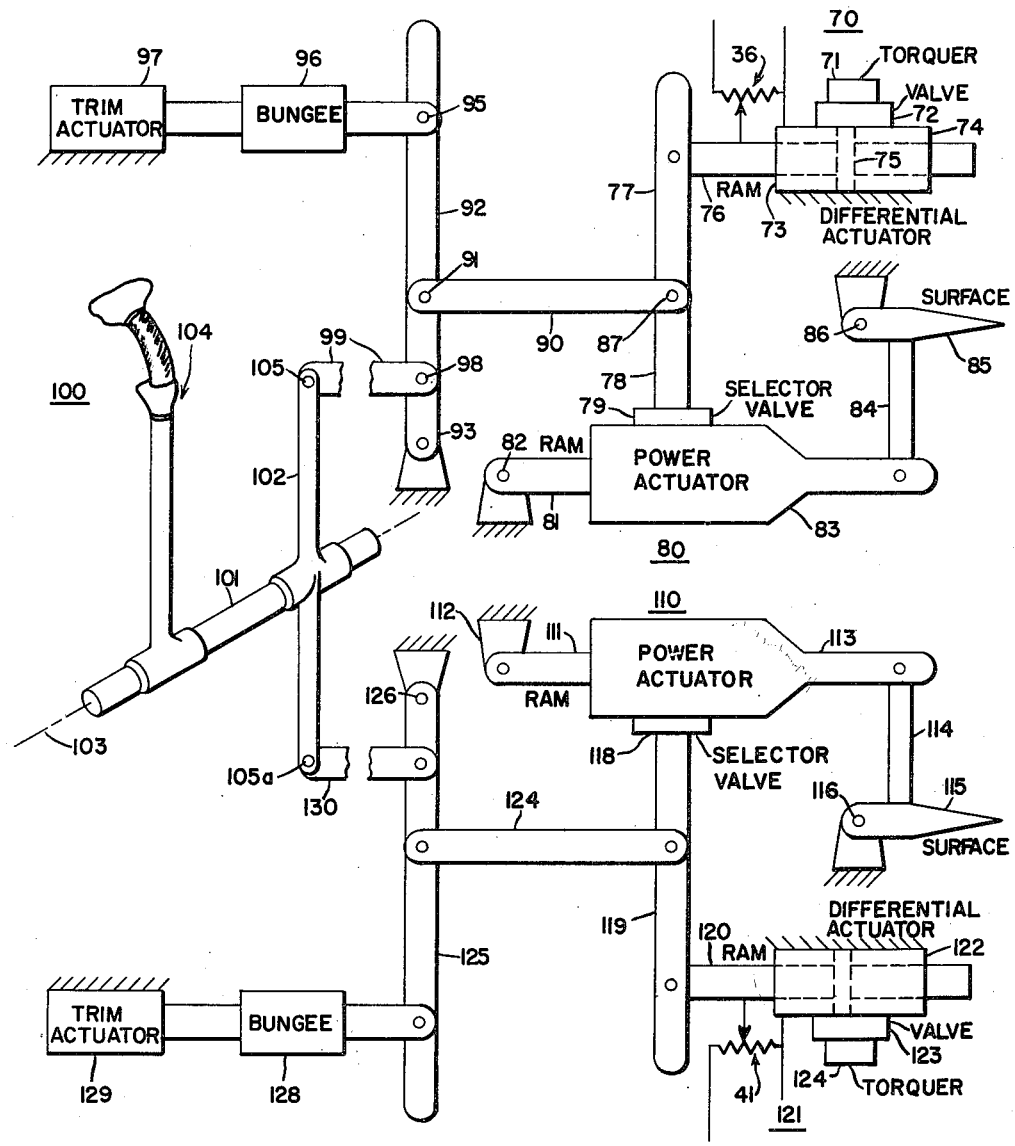
FIG. IB
INVENTORS
RAY L. DUETHMAN
JOHN C. LARSON
BY *Gordon Reed*
ATTORNEY United States Patent Office 3,037,724
Patented June 5, 1962

3,037,724
CONTROL APPARATUS
Ray L. Duethman, St. Paul, and John C. Larson, Minneapolis, Minn., assignors to Minneapolis-Honeywell Regulator Company, Minneapolis, Minn., a corporation of Delaware
Filed Dec. 1, 1959, Ser. No. 856,557
7 Claims. (Cl. 244—77)

This invention relates to automatic control apparatus for controlling a condition and more particularly to control apparatus for controlling the attitude of an aircraft relative to an axis thereof.

In prior control apparatus for an aircraft, attitude of the craft about an axis thereof, has been stabilized by a device responsive to changes in attitude of the aircraft about the axis concerned which effects operation of a control surface to correct for the change in attitude, the displacement of the control surface from a normal position developing a feedback signal which opposes the attitude signal.

In such arrangement where the control surface is displaced in proportion to the attitude error, and if a mistrim condition of the craft exists such as due to unsymmetrical loading or the like, the craft will not attain its desired attitude but rather will attain an attitude wherein the displacement of the control surface is balanced by the attitude error with the displaced surface preventing the craft from departing from the attained attitude. Such a condition is referred to as a "droop" condition and various ways have been provided to eliminate such "droop."

In some instances such "droop" has been eliminated by substituting an effective transient surface displacement signal for a continuous surface displacement signal during operation of the control apparatus. By such arrangement, signals substantially in accordance with surface rate, at low frequencies of craft attitude changes, are opposed to the attitude error signal. Such servo rate signals may be obtained by utilizing time element means for cancelling the "steady state" or low frequency surface displacement signal but permitting the high frequency signals derived from transient operation of the servomotor and surface to supply a signal substantially proportional to the attitude error signal to oppose the attitude error signal. Thereby, it is assured that the attitude of the aircraft ultimately attains the desired attitude with the control surface or surfaces assuming a new trim position. Since the actual attitude corresponds with the desired attitude there is no "droop" in the control system and aircraft.

In some instances as in the lateral control of the craft about its roll axis, two control surfaces such as two aileron surfaces of the craft are utilized in attitude control. Such apparatus may utilize two servomotors, one singly operating one aileron. When such two servomotors are controlled by the same attitude signal utilizing merely transient surface displacement signals, in effect, servo rate signals, both control surfaces may undergo a "drift" from normal position. If such drift occurs, and if the servomotors be of the hydraulic type, ultimately the power ram of each servomotor is displaced from a normal position so that equal maximum displacements of the ram in either direction is "lost" due to the drift action.

It is therefore an object of this invention to provide an improved aileron control channel using a separate servomotor for operating each aileron surface.

A further object of this invention is to prevent "drift" of aileron surfaces of an aircraft when they are each operated by a separate hydraulic servomotor.

A further object of this invention is to provide an improved control channel for an aircraft having its attitude controlled by two control surfaces positioned on either side of the center line of the craft, each surface being separately positioned by a hydraulic servomotor.

It is a further object of this invention to provide an improved aileron control channel wherein drift of the aileron control surfaces which would otherwise cause change in pitch attitude of the craft is prevented.

In the present arrangement of the invention, a control stick of the aircraft may be manually operated to displace the two similar pairs of linkages, each linkage connecting the control stick to one of the two aileron control surfaces of an aircraft. In each of the two similar linkages from the control stick to an aileron surface there is included as stated a series servomotor, also termed a differential servomotor, i.e., one not having its operation reflected in operation of the aircraft pilot operable control stick and wherein the manually operated control stick and servomotor may be independently adjusted as in Cook, Jr. et al. 2,672,307. Note in Cook the torque tube 11 and motor 33' which independently operate valve control rod 15, FIGURE 3.

Both series servomotors are controlled automatically by aircraft flight condition sensing and signal responsive means to maintain a desired condition. The signal responsive means may be controlled specifically by an attitude sensing device and through the series servomotors operates the aileron surfaces in a conventional manner to maintain a desired roll attitude.

Included in such signal responsive means is a rebalancing effect or signal derived in accordance with the series servomotor displacement from a null or normal position. In the present arrangement, electrical signal providing means and electrical signal summing means and techniques for operating servomotors are similar to that disclosed in a prior application, Serial No. 553,131, of Corles Perkins filed December 14, 1955, and assigned to the same assignee as this invention.

Such rebalancing effect from the servomotor herein, much as in the afore-said Perkins application, is supplied through an arrangement or network that cancels steady state servo displacement effects on the signal responsive means. By means of such cancellation of steady state servo position effects, the aircraft will be restored to the desired attitude despite extraneous forces applying a permanent moment tending to upset or change the aircraft attitude. Such attitude upsetting moment is opposed by a displacement of the aileron control surfaces from normal position to apply a counter-balancing moment.

Steady state series servo position feedback effects as stated, are cancelled so that only transient servo displacement effects or electrical signals are transmitted or in other words, only servo displacement rate effects are transmitted to the responsive means.

In some instances, due to faulty rigging or other causes, such as mismatching of corresponding elements in the two differential linkage arrangements, such as the mismatching of amplifiers that individually control the torquer that positions a control valve of a hydraulic servomotor, one series servomotor control valve may be off center position but the other not. This situation may exist while the attitude sensor is in null position and this may occur even without a permanent unbalancing force on the craft applying a control moment tending to change attitude. Such displacement of one control valve results in displacement of the one aileron surface, and the displaced surface causes the change in craft attitude about the roll axis.

To oppose such attitude change, the attitude sensor causes operation of both servomotors in opposite directions to regain the desired attitude, and at such attitude, both aileron surfaces are slightly displaced from the normal position or away from center position.

Assuming for example, that there actually is mismatching of the amplifiers or signal responsive means that control the servomotor valve torquers and assuming with the craft at the desired attitude and both ailerons displaced as stated that in such mismatching one amplifier is not conducting whereas the other one is, the amplifier that is conducting will energize its torquer causing displacement of the servo valve. Such valve displacement causes further displacement of the series servomotor. This results in further displacing its associated aileron surface. Thus, the initial drift of the surfaces is added to that further aileron displacement resulting in change in roll attitude.

Due to this additional aileron displacement, the aircraft again changes attitude which as before, is sensed by the attitude sensing device and the craft again returned to level flight attitude. Thus, at the end of the second corrective operation of the attitude sensing device, both differential servomotors are farther from their normal position than they were at the end of the first corrective operation of the attitude sensing device. For purpose of analysis or explanation, the cycle as evident, repeats itself until ultimately, the two differential servomotors are well away from their normal centered position, and being away from their normal centered position, they do not have equal maximum permissible control displacement in either direction for controlling the craft. In other words, taking an extreme case, the servomotors may be "bottomed" so that ram displacement may be permitted only in one direction and not the other. The table below indicates in step by step manner, how the servomotors may drift or assume a position away from normal centered position because of a tendency initially "to drift" away from center in one of the servomotors and not the other.

|   | Displaced from Normal- Left Aileron and Servo | Attitude | Displaced from Normal- Right Aileron and Servo |
|---|---|---|---|
| 1 | 0° | Level | 0° |
| 2 | 0° | Drift | ½° up. |
| 3 | ½° up | Autopilot Correction | ½° up. |
| 4 | ½° up | Drift | 1½° up. |
| 5 | 1° up | Autopilot Correction | 1° up. |
| 6 | 1° up | Drift | 2° up. |
| 7 | 1½° up | Autopilot Correction | 1½° up. |

The tendency of both ailerons and the differential or series servomotors to "drift" from center, has been corrected in the following described arrangement and thus the objects of the invention obtained by accepting or tolerating a slight attitude error signal of the craft but obatining the advantage of a steady state series servo displacement effect having a small gain but which prevents drift of both series servomotors. The advantage being that without drift each servomotor may be displaced on equal maximum amount in either direction from a null position.

FIGURES 1A and 1B together show a mechanical schematic of apparatus embodying the invention with FIGURE 1A being the schematic of an electrical signal summing system and FIGURE 1B comprising means such as suitable linkage and servomotor operating the control surfaces of an aircraft and controlled from the apparatus in FIGURE 1A.

Referring now to the drawings for a more detailed description of the present invention and more particularly to FIGURE 1A thereof, the combined manual and automatic control apparatus hereof includes an electrical signal system 10 consisting of two balanceable D.C. signal summing networks 11 and 12 that singly control an associated differential or series servomotor.

Since the manner of deriving various D.C. control signals of variable magnitude and reversible polarity from craft attitude sensing devices in accordance with the direction and extent of the error sensed and summing such signals is not new herein, and is similar to that more fully disclosed in the aforesaid Perkins application, the devices for deriving control signals are merely illustrated in block form for simplification. In FIGURE 1A a roll rate signal generator 18 is connected through a summing resistor 22 to a signal summing conductor 21 of network 12 which controls a right aileron servomotor control amplifier or signal responsive means 15. Similarly, the craft roll attitude signal generator 19 through summing resistor 23 and intermediate summing conductor 25 and summing resistor 24 is connected to main summing conductor 21. A bank synchronizer signal generator 20 is connected through summing resistors 26, 27, and 24 to summing conductor 21.

The roll rate signal generator 18 is also connected through summing resistor 30 to a summing conductor 34 of network 11 that controls the left aileron servomotor control amplifier or signal responsive means 14; the roll attitude signal generator 19 is also connected through summing resistors 23 and 31 to summing conductor 34; and the bank synchronizer signal generator 20 is also connected through summing resistors 26, 27, and 31 to summing conductor 34 of network 11.

The left aileron servomotor amplifier control network 11 also includes a left aileron series or differential servomotor displacement feedback signal generator 36 which is connected through transmission network 37 to summing conductor 34. The network 37 comprises a resistor 38 having a high ohmic value and in parallel therewith a resistor 39 having an ohmic value roughly about ⅒ that of resistor 38 and a capacitor 40 in series therewith.

Time varying aileron displacement signals pass through capacitor 40 to conductor 21. Thus resistor 38 and capacitor 40 constitute a time responsive element means.

The various D.C. control signals supplied to summing conductor 34 are algebraically summed and their resultant is converted by a D.C. to A.C. phase sensitive convertor 50, and as modulated the resultant is suppled to amplifier-discriminator responsive means 14 that controls the left aileron series servomotor.

Right aileron servomotor amplifier control network 12 additionally includes a right aileron series servomotor displacement feedback signal generator 41 which is connected through a network 42 to summing conductor 21. Network 42 is similar to network 37 of amplifier control network 11 and comprises a resistor 43 having a high ohmic value in parallel with a capacitor 44 and resistor 45 in series. Again the resistor 45 has an ohmic value roughly ⅒ that of resistor 43.

The signals supplied to summing conductor 21 are modulated by a D.C. to A.C. phase sensitive convertor 52 to provide a positive or negative A.C. signal and the resultant A.C. signal is supplied to the right aileron servomotor control amplifier 15. The left aileron amplifier controlling network 11 and the right aileron amplifier controlling network 12 thus utilize common control signals provided by a roll rate sensing device 18, a vertical gyro roll attitude sensing device 19, and a bank synchronizer 20.

The bank synchronizer signal generator 20 as in the Perkins application constitutes part of a bank synchronizer unit 55 which additionally includes a bank synchronizer amplifier and bank synchronizer motor (the latter two not shown in detail). During the period when the series servomotors are not operable and the aircraft is manually controlled from the conventional control stick, the output of the roll attitude signal generator 19 is supplied to the bank synchronizer amplifier of synchronizer unit 55 which operates the signal generator 20 to develop an equal and opposing signal to that of generator 19 and other signal sources in networks 11 and 12 so that both networks 11 and 12 are balanced.

After the automatic control apparatus using the control networks 11 and 12 is engaged as hereinafter described, at which time the series servomotors are operable, the bank synchronizer unit 55 is not operated to balance networks 11 and 12, and the roll attitude hold mode is in effect. In this instance, the vertical gyro signal generator 19 is disconnected from bank synchronizer unit 55.

The bank synchronizer unit 55 is additionally alternatively controlled from a heading signal source 60 through a contact E. Thus during the heading attitude hold mode, an A.C. heading error signal derived in the heading signal generator 61 is demodulated through an A.C. to D.C. demodulator 62 and supplied through a resistor-capacitor lag network 63 to a signal summing conductor 65 to control the bank synchronizer unit 55. The synchronizer unit 55 displaces the signal generator 20 in accordance with the heading error signal on signal generator 61.

When heading hold from the automatic device is not utilized, the output of heading signal generator 61 is applied to a compass or course stabilizer synchronizer unit comprising a compass synchronizer amplifier and a compass synchronizer motor (not shown) which operates through a motor drive 67 to null the heading signal generator 61.

As stated above, the various signal generators and the method of summing them as well as the bank synchronizer unit 55 and the compass synchronizer unit 66 are similar to that disclosed in the aforesaid Perkins application so that in general, the summing techniques herein are old in the Perkins applications.

The primary difference between the present arrangement and that disclosed in the prior Perkins application is the servomotor arrangement and the inclusion in the feedback networks 37 and 42 of amplifier control networks 11 and 12 of resistors 38 and 43 which provide a small proportional feedback in addition to the high-pass feedback supplied through capacitors 40 and 44. It is apparent that high pass feedback alone is old in the prior Perkins application, note the capacitor 34 of FIGURE 1A thereof.

The output of the servo amplifier 14, FIGURE 1A, controls the left aileron series servomotor 70, FIGURE 1B, which may be of the type disclosed in FIGURE 3B of the aforesaid Perkins application. To effect such control, the amplifier 14 controls a torquer 71 which in turn controls the positioning of a control valve 72. The control valve 72 controls the operation of the power section of the differential actuator 73 comprising conventionally a cylinder 74 and ram 75. The relative displacement of the cylinder 74 and ram 75 results in the development of a servo displacement signal on signal generator or potentiometer 36.

The displacements of ram 75 relative to cylinder 74 are also transmitted through an output member 76 to an arm 77 which at its lower end positions a control valve 79 of a left aileron hydraulic power actuator 80. The actuator 80 comprises a ram member 81 pivoted to an arm 82 fixed to the craft and a movable member 83 pivotally connected to an arm 84 extending from the aileron surface 85 which in turn is pivoted to the craft at 86. Thus, energization of the torquer 71 results in operation of the differential or series actuator 73 that in turn operates the control valve 79 of the power actuator 80 resulting in the displacement of the aileron surface 85.

While the above relates to automatic control of the main actuator valve 79, the valve 79 may also be directly manually positioned. For this purpose the valve actuating arm 77, intermediate its ends, has a pivot 87 which supports a link 90 in turn pivoted at 91 to a further arm 92. Arm 92 is pivoted at its lower end on a supporting pivot 93 and at a third pivot 95 is connected to the bungee 96 and trim actuator 97 of the aircraft. A point 98 intermediate pivots 91 and 93 pivotally supports a manually operable member 99 connected to the conventional manually operable control mechanism 100 of the aircraft. The manual control mechanism of the aircraft comprises a conventional control stick 104 connected to a longitudinally extending member 101 rotatable about an axis 103 in the direction of the craft's longitudinal axis. The member 101 includes an upstanding portion 102 pivotally connected at 103 to link 99.

The mechanism for operating the right aileron surface of the aircraft is similar to that provided for operating the left aileron control surface. This comprises a power actuator 110 comprising a ram member 111 pivoted to an arm 112 fixed to the craft and an output member 113 connected to an arm 114 of the right aileron surface 115 pivoted at 116 to the craft. The actuator 110 includes a control valve 118 operated by an arm 119 and connected at its upper end to an arm 120 of the differential actuator 121 which additionally comprise the cylinder member 122. The actuator is controlled from a valve 123 that in turn is positioned by a torquer 124 controlled by the output of the right aileron servo amplifier 15. The relative displacements of the ram and cylinder effects the operation of the right aileron feedback signal generator 41.

The valve actuator arm 119 is connected through a link 124 to an intermediate portion of arm 125 pivoted at its lower end at 126 to the craft. The upper end of arm 125 is connected to bungee 128 and trim actuator 129. The arm 125 above its pivot 126 has a link 130 extending to pivot 103 of the manually operable linkage 100. For simplification, the manual control stick 104 is shown as rotatable about one axis but is to be understood that as conventional the aircraft control stick may be rotated about two axes mutually perpendicular and the illustration herein is sufficient to illustrate how operation of the control stick 104 in a plane transverse to the aircraft results in operation of one aileron in one direction and the operation of the other aileron in the opposite direction.

*Operation*

When the aircraft, while in flight, is controlled about its roll axis solely by the operation of the control stick 104, which is prior to engaging the automatic control system comprising servos 73 and 121, the control signal voltage at intermediate summing conductor 25, with the various switch arms engaging their "D" contacts shown is fed to the bank synchronizer amplifier in bank synchronizer unit 55 through convertor 56. The D.C. signal on summing conductor 25 is modulated by the D.C. to A.C. converter 56. The bank synchronizer unit 55 operates the bank synchronizer signal generator 20 and thus the bank synchronizer signal from signal generator 20 is continuously following the aircraft roll attitude signal provided by the vertical gyro signal generator 19. Thus summing conductor 25 is at balance condition or at null.

When the roll attitude hold mode is thereafter engaged so that the differential servomotors are automatically operated, the amplifier of the bank synchronizer unit 55 has its input connected to ground as more fully disclosed in the aforesaid Perkins application. The signal from the bank synchronizer generator 20 is now a fixed reference voltage which represents the attitude at which the automatic flight control equipment is engaged. If the aircraft deviates from this attitude, the vertical gyro signal generator 19 will unbalance the summing conductor 25. This error signal will result in the operation or unbalance of networks 11 and 12 resulting in the operation of the respective series servomotors to position their respective surfaces. The error signal on conductor 25 will cause deflection of the ailerons until the aircraft is returned to its original attitude at which time the vertical gyro roll attitude signal again just cancels the bank synchronizer reference signal. The above operation is that occurring during transient maneuvers of the aircraft.

When the aircraft is engaged in the heading hold mode to maintain course, the various switch arms engage their respective "E" contacts. The compass synchronizer unit 66 has its input connected to signal ground. The heading error signal from signal generator 61 after being demodulated is supplied through lag network 63 to the summing conductor 65 and then to the bank synchronizer unit 55 through the D.C. to A.C. phase sensitive converter 56. The bank synchronizer unit 55 operates the bank synchronizer signal generator 20 which is connected to summing conductor 65 through summing resistor 88 whereby to null the voltage on summing conductor 65.

When going from the "pre-engaged" or "synchronizing" in the "D" position of the switch arms, to the "E" position of the switch arms, a signal on the operated bank synchronizer generator 20 would suddenly apply a signal to summing conductor 65 whereas no immediate heading error signal necessarily appears on signal generator 61. This would result in an immediate operation of the bank synchronizer unit 55, resulting in decrease in the signal from generator 20 causing a change in craft heading when actually no heading or course error existed. To correct for this condition, the signal from signal generator 19 is supplied through a path 68 comprising a capacitor 69 to summing conductor 65. Thus, the summing conductor 65 through the capacitor 69 permits the bank synchronizer signal 20 to slowly fade out rather than having a sudden control signal supplied to control the two series servomotors.

The above operation involving attitude hold relates to the operation of the automatic apparatus when the servo displacement signal as from feedback signal generator 36 is supplied only through its capacitor 40 and resistor 39 to the summing conductor 34 and a similar feedback arrangement is provided for the right aileron servo positional feedback only through the capacitor 44. In such operation, a drift of the two aileron surfaces may occur due to mismatching or dissimilarities in the two differential servo or series servomotor trains including the control elements.

We have stated previously that with solely high pass servo position feedback through capacitors 40 and 44 that even should there be a permanent unbalancing moment tending to change roll attitude, that through the two high pass servo feedback loops, the aircraft will be returned to the desired roll attitude position as determined by the bank synchronizer signal generator 20 and the vertical gyro signal generator 19. This desired attitude may be wings level position.

To maintain such desired attitude, there must be a displacement of the two aileron surfaces to counteract the unbalancing moment on the craft which may be due to a mistrim condition or unsymmetrical loading. We may assume that such aileron displacement provides, for illustration, one volt feedback signal on signal generators 36 and 41. We may also assume that in a proportional feedback system that if the vertical gyroscope signal generator 19 develops an opposing signal of one volt to hypothetically balance networks 11 and 12 on an equal signal resistor path that such one volt is developed with the gyroscope off vertical one degree. If however the networks 11 and 12 were to include the resistors 38 and 43 of large ohmic value which transmits the feedback signals, the signal supplied to signal summing conductors 21 and 34 from the feedback signal generators 36 and 41 which thus have a low gain or high resistor path may be balanced by a smaller voltage from the attitude signal generator 19 having a high gain or low resistor path and thereby enabling the vertical gyroscope to be off from the vertical position a smaller angle than 1 degree. We thus have an arrangement whereby for a slight change in craft roll attitude from vertical, there is provided a steady state proportional feedback to networks 11, 12 through resistors 38 and 43 to provide a low gain proportional system for networks 11 and 12. Meanwhile, the transient feedbacks through capacitors 40, 44 supply the transient rebalance effects.

It thus will be apparent that if, due to mismatching or other factors, one series servomotor in the above described apparatus has a tendency to operate its aileron to ultimately cause a drift of both ailerons and if such drift tends to increase, the surface displacement feedback signals which increase in magnitude with drift and are supplied individually either through resistor 38 or through resistor 43 to networks 11 and 12 respectively will develop signals on summing conductors 34 and 21 that if necessary will cause reverse operation of the servos or oppose the tendency of the surfaces to drift. By the above provision, the two differential or series servomotors are so controlled that their respective rams are at substantially the mid position of their cylinders thereby permitting equal amounts of travel in either direction in response to control signals. It is further evident that by preventing the "drift" of the aileron surfaces, any tendency of the aircraft to change attitude about its pitch axis due to such "drift" is corrected.

Although the various signal sources included in the servo control circuits 11 and 12 may be of the potentiometer type, it will be readily appreciated that inductive signal generators may also be utilized in which case the A.C. signal derived therefrom will be demodulated before being summed. Also while the arrangement includes a parallel summing of the D.C. signals, series summing of the signals may be resorted to.

What we claim as new and desired to be secured by Letters Patent of the United States is:

1. Control apparatus for an aircraft having two control surfaces arranged on opposite sides of the craft longitudinal center line for controlling craft attitude, said craft having two servomotors, each motor singly operating a control surface; in combination: two motor control means each singly associated with one servomotor; two balanceable networks, a balanceable network connected solely to one control means the other network connected solely to the other control means; craft attitude signal providing means unbalancing each network; follow-up feedback signal producing means solely driven by each motor and rebalancing its respective network; time responsive element means connected with each follow-up means cancelling steady state feedback signals to said networks; and additional means connected with the follow-up signal producing means and supplying a low gain displacement feedback signal to each network to prevent drift of both control surfaces.

2. Automatic pilot apparatus for an aircraft having two aileron control surfaces arranged to maneuver said craft about the roll axis thereof comprising: a first control channel including first signal responsive actuating means connected to move one of said aileron surfaces; means for producing a first signal in accordance with the deviation of said craft from a desired attitude about its roll axis; means for producing a second signal in response to the displacement of said one surface from a predetermined position; means connecting said first and second signals to energize said first actuating means; a second control channel, including second signal responsive actuating means for moving the other of said aileron surfaces; means for producing a third signal in accordance with the deviation of said craft from a desired attitude about said roll axis; means for producing a fourth signal in response to the displacement of said second surface from a predetermined position; means coupling said third and fourth signals to energize said second actuating means; time responsive element means cancelling steady state effects of said second and fourth signals on said first and second actuating means; and further means for supplying reduced values of said second and fourth signals to said first and second control channels.

3. In control apparatus for an aircraft having a pair of movable control surfaces adapted to turn the craft about an axis thereof said craft including manually operable means for moving each of said surfaces; a first electrically controlled series servomotor moving one surface; controlled means generating a first signal; controlled means generating a second signal in accordance with displacement of said first servomotor from a normal position; means combining said first and second signals in opposition and operating said first servomotor; a second electrically controlled servomotor operating said second surface; controlled means generating a third signal in accordance with displacement of said second motor from a normal position; means combining said first and third signals in opposition and controlling said second servomotor; time responsive element means connected to neutralize the steady state values of at least one of said second and third signals in said combining means; and further means connected to supply a fractional part of said neutralized signal to its combining means.

4. In control apparatus for an aircraft having a pair of movable aileron control surfaces jointly adapted to turn the craft about an axis thereof and having manually operable means for moving said surfaces, in combination: a separate electrically controlled hydraulic motor operating each surface; controller means generating a first control signal; controlled means generating a second signal in accordance wtih the displacement of one servomotor from a normal position; controlled means generating a third signal in accordance with displacement of said second servomotor from a normal position; means combining said first and second signals in opposition and controlling the first servomotor; means combining said first and third signals in opposition and controlling said second servomotor; time responsive element means connected to neutralize steady state values of said second and third signals and further means connected to supply a fractional part of said second and third signals to their respective combining means to prevent drift of said two control surfaces.

5. Condition control apparatus having two reversibly operable control members; a first motor means operating one member; a second motor means operating the other member; condition responsive signal providing means operating both motor means, the signal operating one motor means causing an increase in an effect of one member to change the condition in one direction, said signal operating the other motor means causing a decrease in an effect of said other member to additionally change the condition in said direction; two follow-up feedback motor displacement signal producing means, each solely driven by a motor means; time responsive transmission means connected between each follow-up means and motor means and canceling steady state displacement feedback signals; and additional high resistance means connected between each follow-up signal producing means and motor means and supplying a low gain displacement feedback signal to each motor means, to prevent drift of both members.

6. Control apparatus having two reversibly displaceable condition control members; a first motor means operating one member; a second motor means operating the other member; a condition responsive means providing an error signal upon change in a condition from normal; means controlling the first motor means from the signal thereby causing an increase in an effect of one member to change the condition in one direction; second means controlling the second motor means from said signal and operating the second motor means causing a decrease in an effect of said other member to additionally change the condition in said direction; means for producing a second signal in accordance with the extent of operation of said first motor means; transmission means comprising a high-pass capacitor network causing said second signal to oppose said error signal for controlling said first motor means; a high impedance resistor means shunting said capacitor network and supplying a fractional portion of said second signal in opposition to said error signal for controlling said first motor means; means for producing a third signal in accordance with the extent of operation of said second motor means; additional transmission means comprising a second high-pass capacitor network connecting said third signal in opposition to said error signal for controlling said second motor means; and second high impedance resistor means shunting said capacitor network and supplying a fractional portion of said third signal in opposition to said error signal for controlling said second motor means.

7. Apparatus of the class described, comprising a first and a second servomotor loop, each loop comprising a servomotor, a source of control signal for controlling the servmotors in both loops, a displacement feedback signal generator driven by each servomotor, a first signal transmission network including steady state feedback signal canceler means connecting one servo driven generator in opposition to said control signal for controlling a first servomotor; high impedance means in said transmission network shunting said canceler means and supplying a fractional portion of said feedback signal in opposition to said control signal for controlling said first servomotor; a second signal transmission network including steady state canceler means connecting said other servomotor driven displacement feedback signal generator in opposition to said control signal for controlling said second servomotor; and high impedance means in said second transmission network shunting said canceler means and supplying a fractional portion of said other feedback signal in opposition to said control signal for controlling said second servomotor, to oppose difference in displacements of said servomotors.

References Cited in the file of this patent
UNITED STATES PATENTS

| | | |
|---|---|---|
| 2,439,198 | Bedford | Apr. 6, 1948 |
| 2,740,082 | Sedgfield | Mar. 27, 1956 |
| 2,751,543 | Alderson | June 19, 1956 |
| 2,769,603 | McDonnell | Nov. 6, 1956 |